United States Patent [19]

Patel et al.

[11] Patent Number: 6,145,895
[45] Date of Patent: Nov. 14, 2000

[54] SLEEVE FOR JOINING TUBULAR CONDUITS

[75] Inventors: Jayant Dahyabhai Patel, Lake Forest; Clifford John Petersen, Irvine; Ronald Joseph Talamantez, Fountain Valley, all of Calif.

[73] Assignee: The Boeing Company, Seattle, Wash.

[21] Appl. No.: 09/223,571

[22] Filed: Dec. 30, 1998

[51] Int. Cl.[7] .................................................. F16L 21/02
[52] U.S. Cl. ...................................... 285/369; 285/222.3
[58] Field of Search ..................... 285/236, 417, 285/222.3, 369, 222.1; 138/125, 124

[56] References Cited

U.S. PATENT DOCUMENTS

| Re. 32,607 | 2/1988 | Smith . | |
|---|---|---|---|
| 3,061,339 | 10/1962 | Jewell . | |
| 3,177,015 | 4/1965 | Brown . | |
| 3,310,322 | 3/1967 | Carroll . | |
| 3,836,182 | 9/1974 | Miller . | |
| 4,098,528 | 7/1978 | Stanley | 285/369 |
| 4,101,151 | 7/1978 | Ferguson . | |
| 4,190,088 | 2/1980 | Lalikos | 285/222.3 |
| 4,262,391 | 4/1981 | Peash . | |
| 4,455,041 | 6/1984 | Martin | 285/369 |
| 4,746,147 | 5/1988 | Walker . | |
| 4,824,146 | 4/1989 | Redfield | 285/236 |
| 4,828,557 | 5/1989 | Persidsky | 285/369 |
| 5,096,206 | 3/1992 | Andre | 285/236 |
| 5,413,385 | 5/1995 | Hilbush | 285/15 |
| 5,431,458 | 7/1995 | Schaub et al. . | |
| 5,488,974 | 2/1996 | Shiota | 138/125 |
| 5,505,497 | 4/1996 | Shea et al. . | |
| 5,540,464 | 7/1996 | Picha | 285/417 |
| 5,713,392 | 2/1998 | O'Rourke | 138/125 |

FOREIGN PATENT DOCUMENTS

| 093002316 | 2/1993 | Australia | 285/369 |
|---|---|---|---|

*Primary Examiner*—Lynne H. Browne
*Assistant Examiner*—Aaron Dunwoody
*Attorney, Agent, or Firm*—Alston & Bird LLP

[57] ABSTRACT

A sleeve for coupling together two fluid-handling conduits includes a compressible and resilient tubular core and a protective fabric cover which covers at least portions of the outer surface of the core and is substantially inexpansible in the radial and circumferential directions so as to resist radial and circumferential expansion of the core. The core is preferably a cellular elastomeric foam and the fabric cover advantageously is integrally molded into the core. The core is sized slightly smaller in diameter than the conduits to be joined so that it is expanded radially when installed onto a conduit. Expansion of the core is resisted by the fabric cover, and thus the core is radially compressed and provides a continuous restoring force urging the sleeve against the conduit. The sleeve preferably includes strike-through regions in which the foam material of the core penetrates through to the outer surface of the sleeve so as to form slip-resistant surfaces for engagement by plastic tie-wraps or other clamping devices. The inner surface of the core at both ends preferably includes a fabric layer which provides a slip-enhancing surface facilitating sliding the sleeve over the ends of the conduits or hoses to be joined. In a further preferred embodiment, a pressure-activated or thermally activated adhesive band covers the inner surface of the sleeve for sealing the sleeve to a conduit.

15 Claims, 1 Drawing Sheet

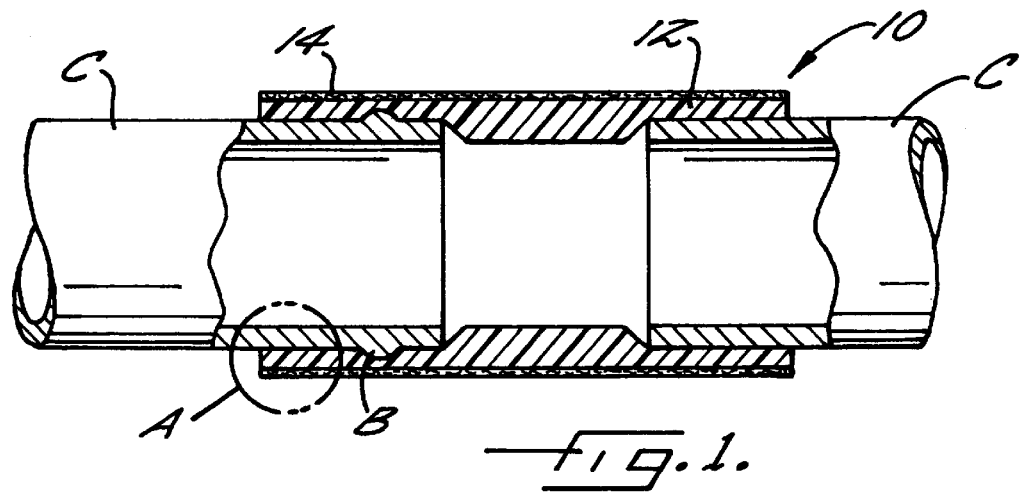
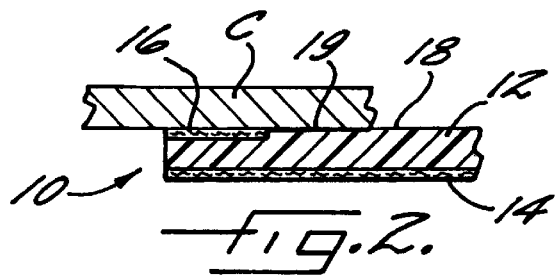
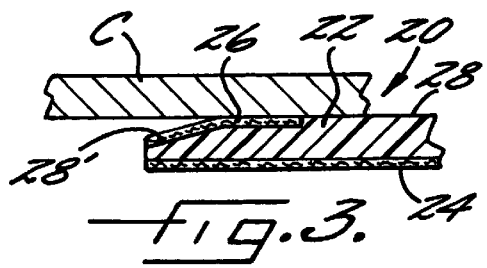
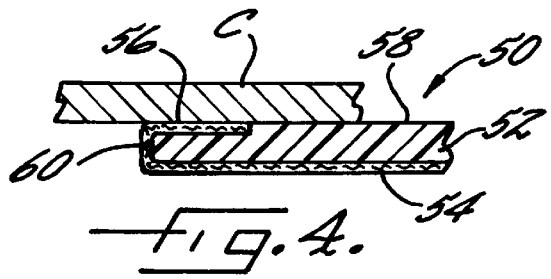
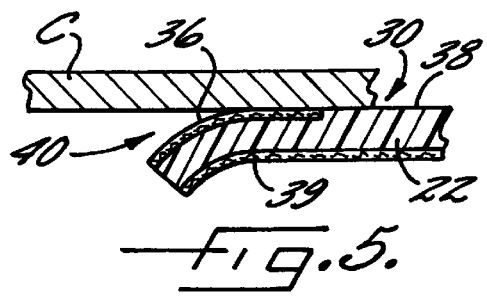
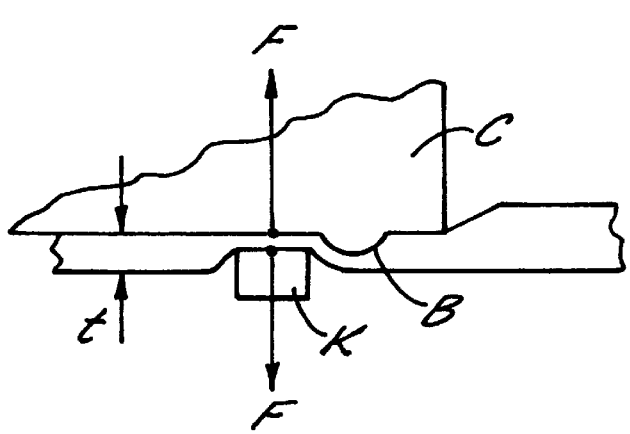
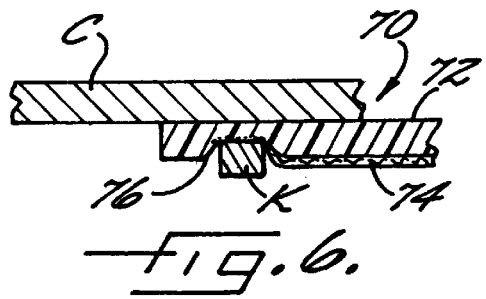

SLEEVE FOR JOINING TUBULAR CONDUITS

FIELD OF THE INVENTION

The present invention relates to coupling devices for joining together two tubular conduits to effect a fluid-tight seal therebetween.

BACKGROUND OF THE INVENTION

In many industrial and manufacturing applications it is necessary to couple the ends of two fluid-handling conduits to effect a fluid-tight coupling therebetween, and accordingly a host of coupling devices have been developed for the purpose. Many of these coupling devices rely on metal band clamps tightened about a sleeve which is slipped over the ends of the conduits so that the sleeve is inwardly compressed against the conduits. Where the fluid within the conduits is under significantly higher pressure than ambient, some provision must be made for preventing the sleeve from "ballooning" outward and possibly failing or causing the sleeve to slip out from under the clamps. Thus, in some coupling devices a single metal band clamp is used which extends continuously over the joint between the two conduits and is tightened at its two ends about the conduits, for example as shown in U.S. Pat. Nos. 4,101,151 and 3,836,182.

In other types of coupling devices, the sleeve itself is made relatively stiff and rigid so as to resist ballooning. For example, in fluid systems for some aircraft, a coupling device sometimes used comprises a sleeve formed of multilayered fiberglass coated with silicone elastomer. The sleeve is sized to fit over the ends of the conduits to be joined and is secured by metal band clamps or the like. A difficulty associated with such coupling devices is that the stiff sleeve is frequently not able to adequately conform to the exterior contour of the conduit to form a reliable seal. For instance, misaligned conduits are difficult to seal with the stiff sleeve because the sleeve is not readily bendable. Sealing difficulties can also be encountered when the interface surface of the conduit is not smooth or has become dented or scratched, when the conduit is sized slightly larger or smaller than nominal, or when the conduit has become otherwise misshapen. If any of the aforementioned circumstances occur, leaks can develop. Thus, where the conduits are misaligned, a worker frequently must rework the conduits to bring them into alignment prior to installing the coupling device. Where the conduits are not smooth or are scratched or dented, a worker must polish and/or fill the surface of the misshapen conduit to provide a smooth surface for the sleeve to seal against. However, such procedures are labor-intensive and time-consuming. Leaks can also develop when relative movement occurs between the two conduits that are joined, because the stiff sleeve does not have enough "give" to compensate for the movement. The usual solution to leaks is to further tighten the clamps, but overtightening the clamps can cause damage to the conduit and/or to the sleeve, leading to potential loss of pressure. The consequences of the pressure loss can include loss of passenger comfort, loss of system performance, damage to or failure of a component, etc.

The coupling device employing the stiff fiberglass/elastomer sleeve also requires a separate wrap of insulation around the joint to prevent thermal and acoustics loss. The insulation typically comprises moisture-resistant insulation batting wrapped with fiber-reinforced perforated plastic film that is heat sealed, stitched, or taped in place. This method of assembly is expensive, labor-intensive, heavy, and unreliable. Moreover, the insulation typically requires periodic replacement if the plastic film becomes torn, if the insulating performance degrades as a result of shifting of the batting and/or repeated wetting and drying of the batting, or if the tape used to secure the plastic film fails or becomes loose because of age.

Thus, it would be desirable to provide a coupling device which has thermal and acoustical insulating functions without the necessity of wrapping a joint with insulation as in existing coupling devices employing stiff sleeves, and which does not degrade in insulating performance as a result of wetting, shifting insulation, or the like. It would also be desirable to provide a coupling device able to satisfactorily seal against scratched or dented conduits, conduits that are slightly larger or smaller than nominal, or conduits that are misshapen, so that reworking of the conduits can be avoided. Additionally, particularly in aircraft applications where a substantial number of coupling devices may be used in a single aircraft, it would be desirable to provide a coupling device having lower cost and lighter weight than existing coupling devices incorporating stiff sleeves and metal clamps and separate insulation materials.

SUMMARY OF THE INVENTION

The above needs are met and other advantages and objects are achieved by the present invention, which provides a coupling sleeve that does not require a separate wrapping of insulation for achieving thermal and acoustical insulating functions. The sleeve is able to satisfactorily seal against scratched or dented conduits, conduits that are slightly larger or smaller than nominal, conduits that are misshapen, and conduits that are oval or other non-round shapes. The sleeve can also be made and installed at lower cost and is lighter in weight than existing coupling devices incorporating stiff sleeves and metal clamps and separate insulation materials.

To these ends, a coupling sleeve in accordance with one preferred embodiment of the invention comprises a tubular core formed of flexible and resiliently compressible slip-resistant material, and a tubular fabric cover. At least a central portion of the inner surface of the core forms a conduit-engaging surface of the sleeve. The tubular fabric cover is joined to the core and forms at least a portion of an outer surface of the sleeve. The core preferably is slightly smaller in inner diameter than the outer diameter of the conduits being joined. Furthermore, the cover preferably is relatively inexpansible in the circumferential and radial directions so that it prevents ballooning of the core. Thus, the sleeve is stretched over the conduits such that the compressible core is radially compressed between the conduits and the generally inexpansible cover.

Preferably, the core comprises an elastomeric foam material, and thus provides thermal and acoustical insulating properties to the sleeve. In a preferred embodiment of the invention, the foam material of the core impregnates partially through a thickness of the fabric cover such that the cover is partially embedded in the core.

The foam core also provides slip-resistant properties so that the sleeve does not readily slip relative to the conduits. Additionally, in accordance with a further preferred embodiment of the invention, the sleeve includes at least one strike-through region in which the foam material of the core impregnates completely through the thickness of the cover and is exposed at the outer surface of the sleeve so as to provide a slip-resistant outer surface. Thus, a clamp such as a band clamp or plastic tie-wrap can be wrapped about the strike-through region for clamping the sleeve onto a conduit, and the strike-through region tends to prevent the clamp from slipping relative to the sleeve. Where a pair of clamps are used for clamping the sleeve onto a pair of conduits, two strike-through regions preferably are provided so that each of the clamps engages one of the strike-through regions.

In accordance with another preferred embodiment of the invention, a fabric layer covers a portion of the inner surface of the core adjacent one end of the core. The fabric layer forms a slip-enhancing surface to facilitate sliding the sleeve over the end of a conduit. Preferably, both ends of the core have fabric layers on their inner surfaces. The fabric layers in one embodiment comprise extensions of the fabric cover which are wrapped over the ends of the core so as to extend onto the inner surface of the core. The wrapped extensions of the cover also seal and protect the end surfaces of the compressible core.

Strike-through regions as described above preferably are provided over a portion of the core which is not covered by the slip-enhancing fabric layers on the inner surface, so that clamps tightened about the sleeve compress the slip-resistant inner surface of the core against the conduits. Because the core is compressible and resilient, partial loosening of a clamp causes the core to resiliently expand so as to take up any additional space created by the loosening of the clamp, so that frequent checking and retightening of clamps in many cases can be avoided. Moreover, the core tends to fill in and conform to irregularities in the surfaces of the conduits. Thus, the sleeve tends to be self-sealing so that reworking of scratched or dented conduits in many cases is unnecessary. Additionally, the sleeve is capable of sealing against oval or other non-round conduits, which are typically difficult to join with conventional sleeves employing substantially rigid band clamps because of the tendency of the clamps to nonuniformly compress the sleeve about the circumference of the conduits. The flexible core and flexible cover of the present sleeve, however, are able to adapt to a variety of conduit shapes.

Advantageously, the inner surface of the core adjacent one or both ends thereof is flared to facilitate sliding the sleeve over the end of a conduit. In one embodiment of the invention, both the inner and outer surfaces of the core adjacent one or both ends are flared so as to form a bell mouth at one or both ends of the sleeve.

As described above, the sleeve may be used in conjunction with clamps for compressing the sleeve against a pair of conduits. However, in many applications where relatively low pressures exist in the conduits to be joined, a sleeve in accordance with the present invention is suitable for use without a clamp. Additionally, a further preferred embodiment of the invention provides a sleeve having adhesive applied over at least a portion of the inner surface of the core for sealing the sleeve to a conduit. A sleeve in accordance with this embodiment is suitable for use in many cases even where the pressure within the conduits is relatively high. Various types of adhesives may be used, including but not limited to thermally activated adhesives which may be activated by heating after the sleeve has been placed over a conduit, or pressure-activated adhesives which for example may be activated by pressure exerted when the sleeve is slid over the end of a conduit.

A further advantage of the sleeves having a fabric cover in accordance with the invention is that the fabric cover tends to prevent not only ballooning which is a problem when the conduit pressure is higher than atmospheric, but also collapsing of the sleeve which is a problem when a vacuum exists within the conduit. In contrast, some conventional coupling devices employing a flexible sleeve clamped by one or more metal band clamps can be susceptible to collapsing of the sleeve under vacuum.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 1 is a side elevation, partly in section, of a sleeve in accordance with one preferred embodiment of the invention installed on the ends of two conduits to effect a coupling therebetween;

FIG. 2 is a somewhat enlarged sectioned side elevation showing the portion A of FIG. 1 in greater detail;

FIG. 3 is a view similar to FIG. 2 but depicting an alternative embodiment of the invention in which the sleeve has a chamfered inner surface at the end;

FIG. 4 is a view similar to FIG. 2 but depicting yet another embodiment of the invention in which the fabric cover is wrapped over the end of the resilient core so as to extend onto the inner surface of the sleeve;

FIG. 5 is a view similar to FIG. 2 but showing another preferred embodiment of the invention in which the end of the sleeve is formed as a bell mouth;

FIG. 6 is a view similar to FIG. 2, showing still another preferred embodiment of the invention in which the sleeve includes a strike-through region at the outer surface of the sleeve for providing a slip-resistant surface about which a clamp is encircled; and FIG. 7 is a schematic fragmentary side sectional view showing a portion of the sleeve of FIG. 6, illustrating the forces exerted by the resilient core tending to expand the core radially outward against the clamp and inward against the conduit.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to FIG. 1, a sleeve 10 in accordance with one preferred embodiment of the invention is shown installed on the ends of a pair of conduits C to effect a coupling therebetween. The sleeve 10 comprises a compressible and resilient core 12 and an outer cover 14 which is joined to the outer surface of the core. The core 12 preferably should have good rebound properties so that when a force compressing the core 12 is removed the core tends to rebound to its original dimensions and shape even when the compressing force is exerted for extended periods of time. An advantageous material for the core 12 is closed-cell silicone foam, which can be made with various compressibilities to suit particular applications. Silicone foam also has good thermal and acoustical insulating characteristics, and thus the sleeve 10 reduces thermal and acoustic loss from the coupling between the conduits C.

The cover 14 preferably is a woven fabric which has good resistance to tearing so that the core 12 is protected from tearing or the like during installation and use of the sleeve. The cover 14 preferably also limits the extent to which the sleeve 10 can expand outwardly so that substantial ballooning of the sleeve under pressure loads is prevented. A small amount of ballooning may be tolerable in many applications. The degree of expansibility of the fabric cover can be selected to suit a particular application. The expansibility of the fabric in the lengthwise, radial, and circumferential directions is primarily a function of the weave and the material. Various fibers can be used for making the cover, including natural and synthetic materials. Synthetic fibers which are suitable include polyesters such as Dacron, or the like. The weave of the fabric cover 14 preferably allows the cover to stretch in the length direction of the sleeve but does not allow substantial expansion in the radial and circumferential directions so that ballooning is controlled as noted above. However, a limited degree of expansion in the radial and circumferential directions may be desirable in order to allow the sleeve 10 to fit a range of conduit diameters, which for example might occur as a result of variations in manufacturing tolerances during manufacture of the conduits.

The sleeve 10 in a relaxed state advantageously has an inner diameter about equal to the inner diameter of the conduits C. Accordingly, the sleeve 10 must be expanded radially and circumferentially in order to fit over the ends of the conduits C. Preferably, the majority of the expansion occurs through compression of the core 12, and the cover 14 has significantly less propensity to expand so that it resists the expansion of the core 12. This can be seen most readily in the area of the outwardly protruding bead B formed on the outer surface of the conduit C on the left side of FIG. 1. The bead B causes the core 12 to be compressed between the cover 14 and the bead B because the cover 14 does not substantially expand. The compressible core 12 is essentially a spring which tends to have greater restoring force the more it is compressed. Accordingly, the restoring force tending to urge the sleeve 10 against the outer surface of the conduit C is greater in the area over the bead B than for the rest of the sleeve 10 and thus tends to provide a greater resistance to leakage past the interface between the sleeve 10 and the conduit C. Thus, in some applications such as higher-pressure applications, it may be desirable to include a bead on one or both of the conduits. However, even without a bead on the conduit, the core 12 is compressed between the cover 14 and the conduit outer surface so that a restoring force of the core 12 urges the core against the conduit and thus seals the interface therebetween. Advantageously, the core 12 undergoes a maximum compression of about 60 percent of its relaxed radial thickness when the sleeve is installed on a conduit.

The core 12 and cover 14 thus work together to form a flexible and stretchable sleeve 10 which is able to accommodate variations in conduit size and/or shape. The resilient core 12 of the sleeve 10 tends to conform to dents, scratches, or other non-smooth regions of the conduit outer surfaces, in contrast to coupling devices employing rigid sleeves of fiberglass or the like which are substantially incapable of conforming to such non-smooth contours. Additionally, the sleeve 10 works well on oval or other non-round conduits in order to form a fluid-tight coupling.

With reference to FIG. 2, the sleeve 10 preferably includes a fabric layer 16 on the inner surface 18 of the core 12 adjacent at least one end, and preferably adjacent both ends, of the sleeve. The fabric layer 16 provides a slip-enhancing surface that facilitates sliding the sleeve 10 over the end of the conduit C. The fabric layer 16 has a limited lengthwise extent so that most of the inner surface 18 of the sleeve 10 in the central portion of the sleeve is formed of the foam core material, which tends to be slip-resistant. In this way, the sleeve 10 is provided with slip resistance so that it tends not to slide on the conduits once installed thereon. The sleeve 10 without any clamp is capable of providing an essentially leak-free coupling at positive and negative gage pressures having magnitudes up to 2.0–2.5 psig. The preferred construction comprising a silicone foam core and a Dacron fabric sleeve enables the sleeve to be used over a broad range of temperatures, for example from about −65° F. to +500° F., for transferring air, other gases, or fluids.

Where higher gage pressures must be contained, the sleeve 10 can be adhesively joined to the conduits C by an adhesive layer 19 interposed between the inner surface 18 of the core 12 and the outer surface of the conduits. Advantageously, the adhesive layer 19 is applied to the inner surface 18 of the sleeve prior to the sleeve being slid over the end of the conduit C. For example, the adhesive layer 19 may be formed during manufacturing of the sleeve so that it is an integral part of the sleeve. Suitable adhesives include thermally activated adhesives which are activated by heating the sleeve and conduit after the sleeve is installed onto the conduit, and pressure-activated adhesives which may be activated, for example, by the sliding action between the sleeve and the conduit when the sleeve is initially installed onto the conduit. Alternatively, a brushable type of adhesive may be applied to the outer surface of the conduit and/or the inner surface of the sleeve immediately prior to installation of the sleeve onto the conduit.

To further facilitate sliding the sleeve over the ends of the conduits, an alternative preferred embodiment of a sleeve in accordance with the invention is shown in FIG. 3. The sleeve 20 includes a resilient core 22 and outer cover 24, and a fabric layer 26 on the inner surface 28 adjacent one end, and preferably adjacent both ends, of the sleeve. In addition, the sleeve 20 also includes a chamfered portion 28' of the inner surface 28 at one end, and preferably at both ends, of the sleeve such that the inner surface is flared outwardly. The flared inner surface 28' further facilitates initial insertion of a conduit C into the sleeve and also provides a larger entrance to the sleeve for accommodating variations in conduit size. The fabric layer 26 preferably covers the flared portion 28' and terminates slightly inward of the flared portion.

FIG. 5 depicts yet another embodiment of the invention in which the sleeve 30 has both the inner surface 38 and the outer surface 39 of the core 32 flared or curled outwardly to form a bell mouth 40 at one or both ends of the sleeve for facilitating insertion of the conduit C into the sleeve. A fabric layer 36 covers the inner surface of the core 32 in the bell mouth portion of the sleeve and terminates slightly inward of the bell mouth 40. The outer cover 34 if desired may be terminated in the region of the bell mouth 40, but preferably extends over the bell mouth 40 to provide resistance to damage such as tearing or the like, which the bell mouth 40 may be particularly susceptible to because of its larger diameter relative to the rest of the sleeve 30.

In the embodiments of the invention described above in connection with FIGS. 1–3 and 5, the outer cover and the fabric layers on the inner surface at the ends of the sleeve are depicted as being separate pieces of material. However, it may be advantageous to form the cover and inner fabric layers as one integral piece of material. FIG. 4 depicts a sleeve 50 in accordance with a further preferred embodiment of the invention, in which the cover 54 is extended beyond the end of the core 52 and is wrapped over the end and onto the inner surface 58 of the core so as to form a fabric layer 56 on the inner surface adjacent the end of the sleeve. Both ends of the sleeve 50 preferably include the wrapped extensions of the cover 54 forming fabric layers 56 at both ends of the sleeve. The wrapped extensions of the cover 54 provide protection for the end surfaces 60 of the core 52.

Although the sleeves 10, 20, 30, and 50 can be used without clamps as described above, the invention is not limited to sleeves used without clamps. In some applications, it may be desirable to provide clamps for further compressing the foam core of the sleeve against the conduit in order to achieve a tighter seal with the conduit. Thus, a further preferred embodiment of the invention is shown in FIGS. 6 and 7, in which a sleeve 70 comprises a resilient core 72 and an outer fabric cover 74 which extends the length of the core 72. The sleeve 70 includes at least one strike-through region 76 adjacent one end of the sleeve, and preferably includes a pair of strike-through regions adjacent both ends of the sleeve. The strike-through region 76 is a region of the sleeve in which the material of the foam core 72 penetrates through the fabric cover 74 such that the foam material is exposed at the outer surface of the sleeve 70. The strike-through region 76 thus provides a slip-resistant surface about which a clamp K can be encircled for compressing the sleeve 70 against the conduit C. The slip-resistant surface of the strike-through region 76 tends to resist slipping of the clamp K relative to the sleeve so as to reduce the tendency of the sleeve to be pulled out from under the clamp by pressure loads.

FIG. 7 schematically illustrates an advantageous feature of the present invention. A sleeve 70 is shown installed on a conduit C with the aid of a clamp K which compresses the sleeve against the conduit. The resilience of the core of the sleeve causes restoring forces F to be exerted on the clamp K and on the conduit C so as to constantly urge against the conduit. Even if the clamp K should expand outwardly, as long as the radial expansion of the clamp does not exceed the unclamped radial thickness t of the sleeve, the sleeve 70 will expand to fill the space between the clamp and the conduit and a continuous restoring force will be exerted keeping the sleeve sealed against the conduit. Thus, the sleeves of the present invention are suitable for use with nylon tie-wraps, which are prone to hygroscopic expansion, as well as with other types of clamps such as metal band clamps or the like. FIG. 7 also illustrates the inclusion of a bead B on the conduit C for helping to prevent the sleeve 70 and clamp K from being pulled off the end of the conduit.

Any of the sleeves described above may be manufactured in various ways. One advantageous method of making a sleeve in accordance with the invention is to place a tubular fabric cover into a tubular mold and inject a foam-forming composition into the mold on the inner surface of the fabric cover. The composition expands to fill the mold and in the process of expansion partially penetrates through the fabric cover. Strike-through regions can be provided by causing total penetration of the composition through the fabric in selected regions thereof, as understood by those skilled in the art. Upon curing of the composition, the foam material which penetrates into the fabric cover causes the cover to be integrally joined to the core.

Alternatively, a foam core may be molded in tubular form, and then a fabric sheet may be wrapped about and adhesively joined to the outer surface of the core. The fabric may be configured to cover only a central portion of the core so that the opposite end portions have foam material exposed at the outer surface of the sleeve for providing slip-resistant surfaces for clamps, as previously described.

Still another method for making a sleeve comprises forming a composite sheet of foam material having a fabric sheet joined to one side thereof, wrapping the composite sheet into a tubular form such that the two lengthwise-extending edges of the composite sheet come together, and adhesively joining the two lengthwise-extending edges of the composite sheet to form a tubular sleeve. The edges of the sheet may be joined with any suitable adhesive capable of providing a sufficiently strong bond to prevent splitting of the sleeve along the seam in view of the expected pressure or vacuum loads that the sleeve must withstand in use.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A sleeve for joining together opposing ends of two tubular conduits, comprising:
   a tubular core having inner and outer surfaces and formed of flexible and resiliently compressible, slip-resistant, elastomeric foam material, at least a central portion of the inner surface of the core forming a conduit-engaging surface of the sleeve; and
   a tubular fabric cover joined to the core and forming at least a portion of an outer surface of the sleeve, wherein the foam material of the core impregnates partially through a thickness of the fabric cover such that the cover is partially embedded in the core.

2. The sleeve of claim 1, wherein the sleeve includes at least one strike-through region in which the foam material of the core impregnates completely through the thickness of the cover and is exposed at the outer surface of the sleeve so as to provide a slip-resistant outer surface.

3. The sleeve of claim 2, further comprising a clamp adapted to be encircled about the strike-through region and operable to be reduced in circumference so as to clamp the sleeve onto a conduit and compress the core, the resilient core providing a continuous restoring force urging the sleeve against the clamp and conduit.

4. The sleeve of claim 2, further comprising another strike-through region, the two strike-through regions being proximate opposite ends of the sleeve.

5. The sleeve of claim 4, further comprising a fabric layer covering a portion of the inner surface of the core adjacent one end of the core, the fabric layer forming a slip-enhancing surface to facilitate sliding the sleeve over the end of a conduit.

6. The sleeve of claim 5, further comprising another fabric layer covering a portion of the inner surface of the core adjacent an opposite end of the core.

7. The sleeve of claim 4, wherein the inner surface of the core adjacent one end thereof is flared to facilitate sliding the sleeve over the end of a conduit.

8. The sleeve of claim 7, wherein both the inner and outer surfaces of the core adjacent the one end are flared so as to form a bell mouth at the one end.

9. The sleeve of claim 7, wherein both ends of the core have flared inner surfaces.

10. The sleeve of claim 4, further comprising a band of adhesive applied to a portion of the inner surface of the core for sealing the sleeve to a conduit.

11. The sleeve of claim 10, wherein the adhesive comprises at least one of a pressure-activated adhesive and a thermally activated adhesive.

12. A sleeve for joining together opposing ends of two tubular conduits, comprising:

a tubular core having inner and outer surfaces and formed of flexible and resiliently compressible slip-resistant material, at least a central portion of the inner surface of the core forming a conduit-engaging surface of the sleeve;

a tubular fabric cover joined to the core and forming at least a portion of an outer surface of the sleeve; and a fabric layer covering a portion of the inner surface of the core adjacent one end of the core, the fabric layer forming a slip-enhancing surface to facilitate sliding the sleeve over the end of a conduit, wherein the fabric layer comprises an extension of the fabric cover which is wrapped over the one end of the core so as to extend onto the inner surface of the core.

13. A sleeve for joining together opposing ends of two tubular conduits, comprising:

a tubular core having inner and outer surfaces and formed of flexible and resiliently compressible thermally insulating foam material, at least a central portion of the inner surface of the core forming a conduit-engaging surface of the sleeve, the tubular core being formed of one piece of said flexible and resiliently compressible thermally insulating material that extends from one end of the sleeve to an opposite end thereof;

a tubular fabric cover joined to the core and forming at least a portion of an outer surface of the sleeve, the cover being generally inexpansible radially and circumferentially so as to resist ballooning of the core; and adhesive applied over at least a portion of the inner surface of the core for sealing the sleeve to the conduits, the adhesive comprising at least one of a pressure-activated adhesive and a thermally activated adhesive.

14. The sleeve of claim 13, wherein the core comprises an elastomeric foam material.

15. The sleeve of claim 13, wherein the cover comprises a woven fabric.

* * * * *

UNITED STATES PATENT AND TRADEMARK OFFICE
CERTIFICATE OF CORRECTION

| | |
|---|---|
| PATENT NO. : 6,145,895 | Page 1 of 1 |
| DATED : November 14, 2000 | |
| INVENTOR(S) : Patel et al. | |

It is certified that error appears in the above-identified patent and that said Letters Patent is hereby corrected as shown below:

<u>Title page,</u>
Item [56] References Cited, FOREIGN PATENT DOCUMENTS, "093002316 2/1993 Australia" should read -- WO93/02316 2/1993 WIPO --.

<u>Claims,</u>
<u>Column 8, claim 5,</u>
Line 49, "claim 4" should read -- claim 1 --;

<u>Column 8, claim 7,</u>
Line 57, "claim 4" should read -- claim 1 --;

<u>Column 8, claim 10,</u>
Line 65, "claim 4" should read -- claim 1 --.

Signed and Sealed this

Thirtieth Day of October, 2001

*Attest:*

*Nicholas P. Godici*

NICHOLAS P. GODICI
*Attesting Officer*     *Acting Director of the United States Patent and Trademark Office*